United States Patent [19]

Bartley

[11] Patent Number: 5,283,022
[45] Date of Patent: Feb. 1, 1994

[54] RESTRICTOR FOR TIRE MOLD VENT PASSAGE AND METHOD OF USE

[75] Inventor: Donald R. Bartley, Cuyahoga Falls, Ohio

[73] Assignee: The Uniroyal Goodrich Tire Company, Akron, Ohio

[21] Appl. No.: 794,293

[22] Filed: Nov. 6, 1991

Related U.S. Application Data

[63] Continuation of Ser. No. 415,498, Sep. 29, 1989, abandoned.

[51] Int. Cl.$^5$ ............................................. B29C 35/04
[52] U.S. Cl. .................................. 264/102; 264/315; 264/326; 264/DIG. 78; 264/501; 425/32; 425/812; 425/DIG. 60
[58] Field of Search ................. 425/28.1, 29, 36, 44, 425/812, 40, 32, DIG. 60; 156/87; 264/102, 315, 326, 501, DIG.78

[56] References Cited

U.S. PATENT DOCUMENTS

| | | | |
|---|---|---|---|
| 1,746,107 | 2/1930 | De Mattia | 425/28.1 |
| 3,377,662 | 4/1968 | Fukushima | 425/812 |
| 3,518,335 | 6/1970 | Jablonski | 264/315 |
| 3,854,852 | 12/1974 | Carter | 425/40 |
| 3,891,363 | 6/1975 | Sievers et al. | 425/28.1 |
| 4,021,168 | 5/1977 | Dailey | 425/28.1 |
| 4,436,497 | 3/1984 | Dahl, et al. | 425/28.1 |
| 4,597,929 | 3/1986 | Blayne | 264/102 |
| 4,600,467 | 7/1986 | Perdue | 425/36 |
| 4,795,331 | 1/1989 | Cain et al. | 425/28.1 |

FOREIGN PATENT DOCUMENTS

| | | | |
|---|---|---|---|
| 648270 | 11/1964 | Belgium | 425/812 |
| 159537 | 10/1985 | European Pat. Off. | 156/87 |

Primary Examiner—Jan H. Silbaugh
Assistant Examiner—Mathieu Vargot
Attorney, Agent, or Firm—Alan A. Csontos

[57] ABSTRACT

A tire molding system includes a mold having a surface defining a cavity for receiving and shaping an uncured tire. The uncured tire is pressed against the surface defining the cavity. Fluid is evacuated from between the uncured tire and the surface defining the cavity. A recess extends from the cavity for forming a marking on the sidewall of the tire. A passage fluidly communicates the recess with the exterior of the mold. The passage includes a first end portion adjacent the recess and a second end portion adjacent the exterior of the mold. The second end portion extends for a distance less than one-half of the total length of the passage. A restrictor is located entirely within the second end portion of the passage for restricting fluid flow through the passage during the evacuation of fluid and before the recess is sealed off from the cavity by the uncured tire when the uncured tire is pressed against the surface defining the cavity.

28 Claims, 4 Drawing Sheets

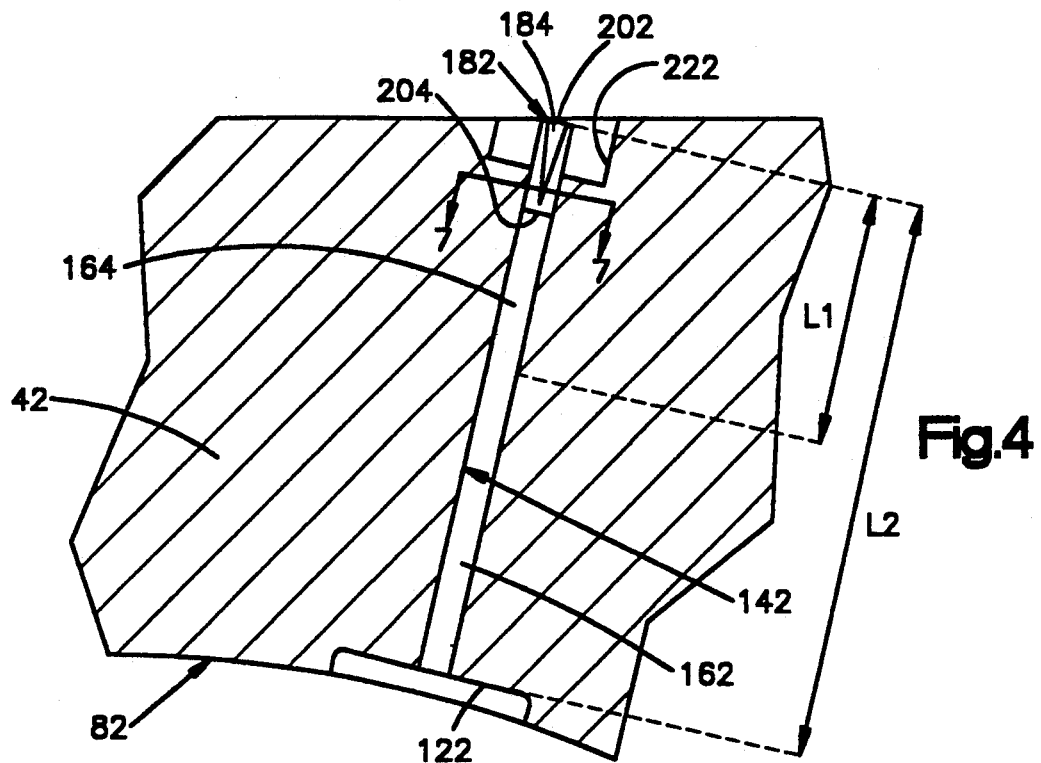
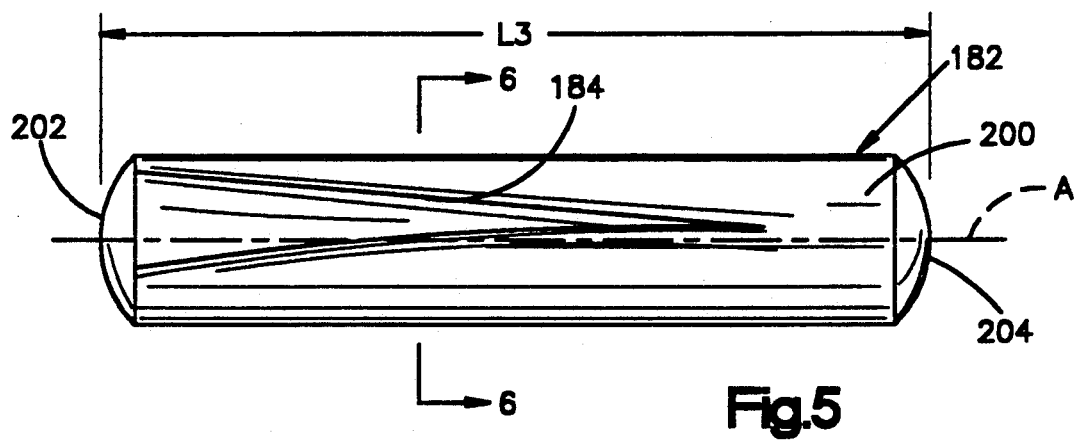
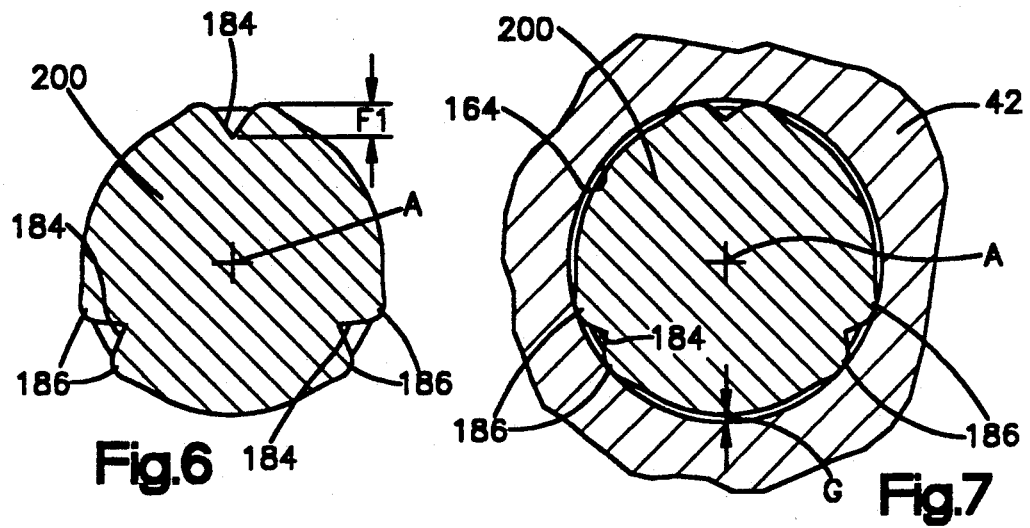

RESTRICTOR FOR TIRE MOLD VENT PASSAGE AND METHOD OF USE

This is a continuation of copending application Ser. No. 07/415,498 filed on Sep. 29, 1989, now abandoned.

BACKGROUND OF THE INVENTION

1. Field of the Invention

The present invention relates to vacuum molding a vehicle tire. In particular, the present invention relates to venting to atmosphere a recess in a tire mold for forming a marking on the tire, such as a raised white letter or a white sidewall.

2. Description of the Prior Art

Vacuum molding systems for a vehicle tire are known. One such vacuum molding system is disclosed in U.S. Pat. No. 4,597,929. The vacuum molding system disclosed U.S. Pat. No. 4,597,929 includes a mold having a surface defining a cavity for receiving and shaping an uncured tire. An inflatable bladder presses the uncured tire against the surface defining the cavity. As the uncured tire is being pressed against the surface defining the cavity, a vacuum source is actuated. The vacuum source removes air from between the external surface of the tire and the surface defining the cavity. The tire is then cured by heat and pressure.

There are often relatively deep blind pockets or recesses extending from the cavity. The deep recesses are for forming some marking on the side of the tire, such as a raised white letter or a white sidewall. If air is not sufficiently evacuated from each recess, a blemish in the marking may result. The blemish occurs when the uncured tire is pressed against the surface defining the cavity and seals off the recess from the vacuum source. When the recess is sealed off, evacuation of air from the recess is blocked. The air in the recess prevents a portion of the marking from completely filling the recess and engaging all of the surfaces defining the recess. Thus, proper curing of that portion of the marking may be prevented which can result in a buildup of deposits in a portion of the recess.

One resolution to the problem of a sealed recess is to fluidly connect the recess with the vacuum source through a passage. A vent plug is inserted in the passage adjacent the recess to limit the flow of rubber into the passage. The vent plug often becomes clogged with cured rubber and must be removed from the passage to provide effective venting of the recess. However, the vent plug is often difficult to access and removal is a cumbersome and labor intensive operation.

Another resolution to the problem of a sealed recess is to vent the recess to the exterior of the mold and to atmosphere through a passage. However, if the flow of air from atmosphere through the passage is not restricted during the evacuation cycle, before the recess is sealed off by the uncured tire, too much air can enter the cavity. This burdens the vacuum source and reduces the effectiveness of the vacuum molding system. One way to minimize the flow of air into the cavity is to insert a vent plug in the passage. However, the problems associated with clogging and accessibility of the vent plug occurs, as described above. Furthermore, the opening in known vent plugs are relatively large and do not sufficiently limit air flow into the cavity. For example, U.S. Pat. No. 4,436,497 discloses a vent plug having an opening with a diameter of approximately 0.024 inch. Other vent plugs are known which have an opening with a diameter of approximately 0.015 inch. This size opening yields an area for air to flow through of approximately 0.00018 square inch.

U.S. Pat. No. 4,021,168 discloses a restrictor located in a passage which communicates the sidewall area of the tire mold with the exterior of the mold. The restrictor extends substantially the entire length of the passage. The restrictor must be removed from the mold in a direction toward the cavity and not toward the exterior of the mold. The head of the restrictor forms a recess in the exterior of the tire which may be visually objectionable.

SUMMARY OF THE INVENTION

The present invention is directed to a system for vacuum molding a tire. The system includes a restrictor that severely limits fluid flow from the exterior of the mold to the cavity during evacuation of the cavity. The restrictor does not suffer from the problems associated with clogging and is relatively easy to remove and replace.

A tire mold for the vacuum molding system has a surface defining a cavity to receive and shape an uncured tire. The external surface of the uncured tire is pressed against the surface defining the cavity. Fluid is evacuated from between the uncured tire and the surface defining the cavity. A recess extends from the cavity to form a marking on the tire, such as a raised white letter or white sidewall. A passage provides fluid communication between the recess and the exterior of the mold. The passage includes a first end portion adjacent the recess and a second end portion adjacent the exterior of the mold. The second end portion of the passage extends for a distance less than one half of the total length of the passage taken in a direction substantially parallel to the direction of fluid flow through the passage. A restrictor is removably insertable into the second end portion of the passage and is located completely within the second end portion of the passage. The restrictor limits fluid flow into the recess and cavity through the passage during evacuation of fluid from between the uncured tire and the surface defining the cavity.

The restrictor comprises a cylindrical member. At least one groove is located in the exterior of the cylindrical member. The groove extends from a first axial end of the cylindrical member to adjacent a second axially opposite end of the cylindrical member. The groove has a depth taken in a direction radially of the longitudinal central axis of the cylindrical member. The depth decreases as the groove extends from the first axial end of the cylindrical member to the second axial end of the cylindrical member. The cylindrical member is positioned in the second end portion of the passage so the first axial end of the cylindrical member is located closer to the exterior of the mold than the second axial end of the cylindrical member. The cylindrical member is insertable into the second end portion of the passage a variable depth to vary the fluid flow through the passage.

A further feature of the present invention includes an enlarged portion of the second end portion of the passage located adjacent the exterior of the mold. The enlarged portion has a greater cross-sectional area than the cross-sectional area of the second end portion of the passage. The enlarged portion allows easy access for a suitable tool to grip the cylindrical member and remove the cylindrical member from the second end portion of the passage.

BRIEF DESCRIPTION OF THE DRAWINGS

Further features of the present invention will become apparent to those skilled in the art to which the present invention relates from reading the following specification with reference to the accompanying drawings, in which:

FIG. 4 is an enlarged cross-sectional view of a portion of the tire mold in FIG. 1 illustrating a restrictor in a vent passage;

FIG. 5 is a longitudinal plan view of the restrictor in FIG. 4;

FIG. 6 is a cross-sectional view of the restrictor in FIG. 5, taken approximately along line 6—6 in FIG. 5; and FIG. 7 is a cross-sectional view of the restrictor located in the vent passage in FIG. 4, taken approximately along line 7—7 in FIG. 4.

DESCRIPTION OF A PREFERRED EMBODIMENT

Figure 1:
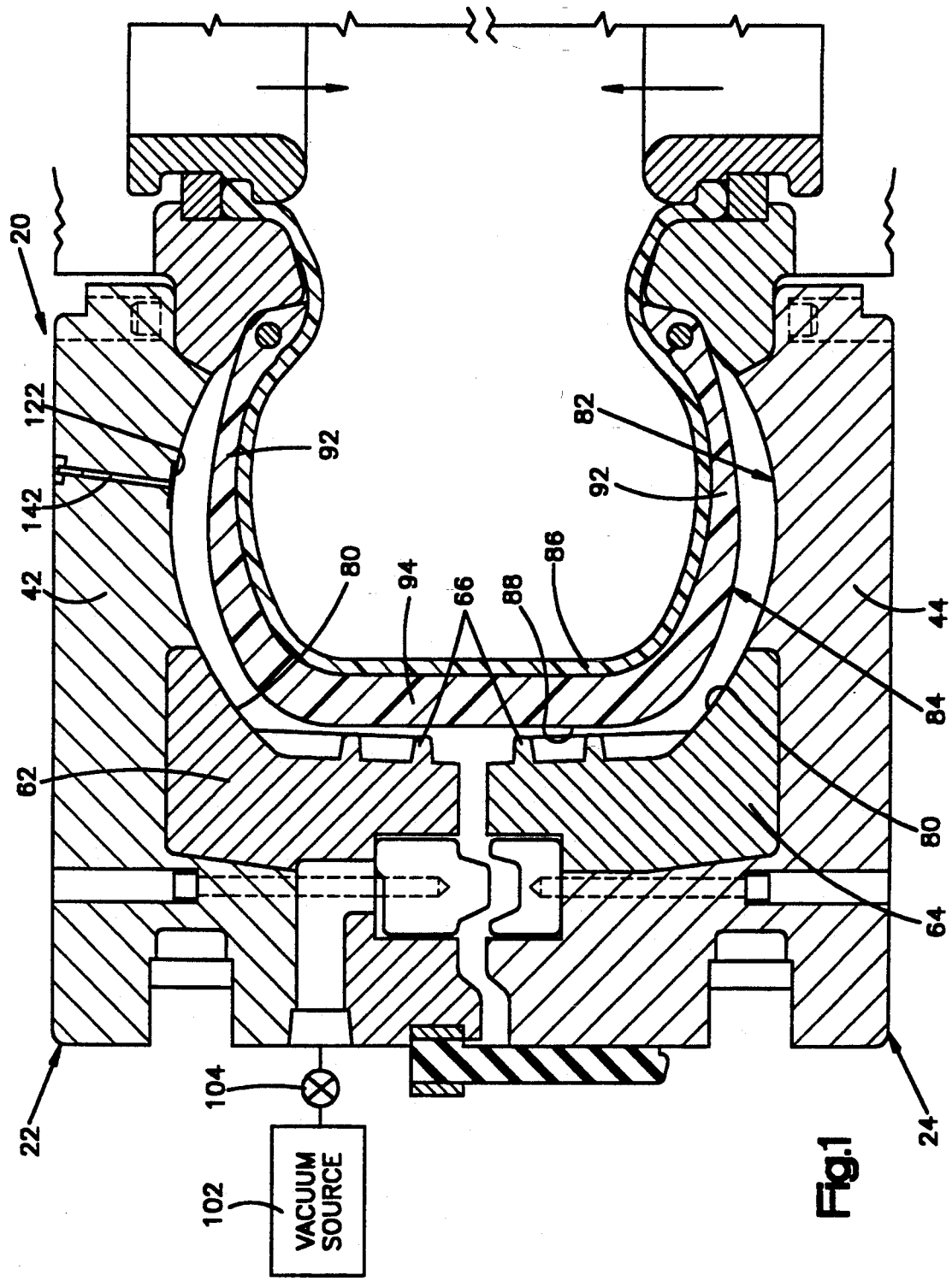
FIG. 1 is a cross-sectional view of a portion of a tire mold embodying the present invention.

A tire mold 20 for shaping and curing a vehicle tire is illustrated in FIG. 1. An uncured tire is typically made from elastomeric material, such as rubber, that is capable of limited viscous flow prior to curing. The rubber may be any suitable natural or synthetic rubber or a combination of the two.

The tire mold 20 includes a pair of mold halves 22,24. The mold halves 22,24 are illustrated in FIG. 1 in a position just before completely closing together. The mold half 22 includes a sidewall portion 42 attached to a tread ring 62. The mold half 24 includes a sidewall portion 44 attached to a tread ring 64. The sidewall portions 42,44 and tread rings 62,64 have inner surfaces 80 defining a cavity 82. The cavity 82 is for receiving an uncured tire 84.

A bladder 86 is inflatable to press the uncured tire 84 against the surfaces 80 defining the cavity 82 to give a final shape to the tire and to help cure the tire. The bladder 86 is illustrated in FIG. 1 beginning to expand the uncured tire 84 outwardly. Upon further pressurization of the bladder 86 from the position illustrated in FIG. 1, the uncured tire 84 is progressively forced outwardly against the surfaces 80 defining the cavity 82 to the positions illustrated in FIGS. 2 and 3.

A vacuum source 102 (FIG. 1) of a vacuum molding system removes fluid, such as air, from between the exterior surface 88 of the uncured tire 84 and the surfaces 80 defining the cavity 82 as the uncured tire is forced against the surfaces defining the cavity. The vacuum source 102 creates pressure in the cavity 82 below atmospheric pressure. The application of this negative pressure to the cavity 82 by the vacuum source 102 is controllable by the opening and closing of a valve 104. The function and operation of such a vacuum molding system is disclosed in U.S. Pat. No. 4,597,929 and is incorporated herein by reference.

Figure 2:
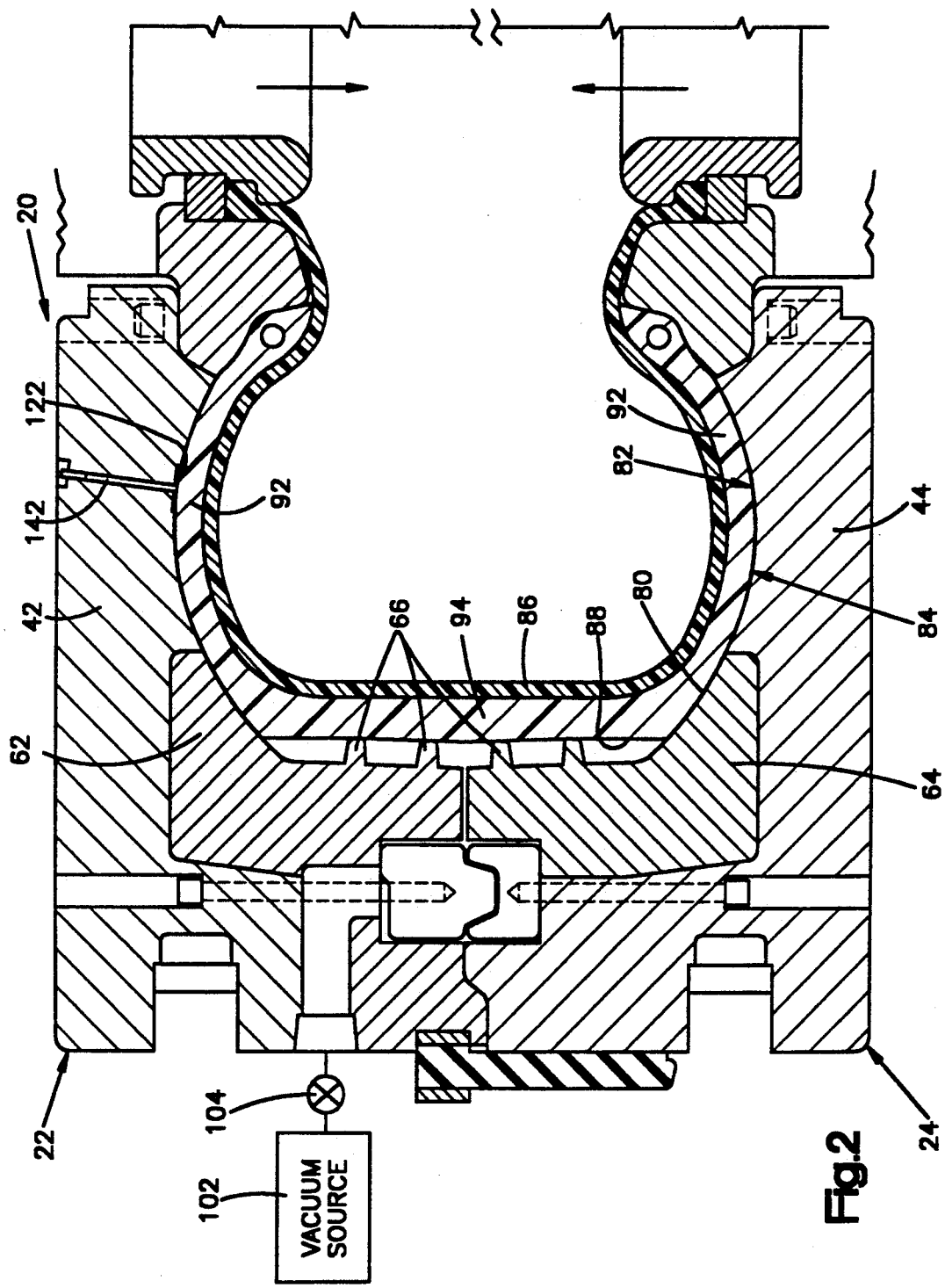
FIGS. 2 and 3 are views of the tire mold similar to FIG. 1 with parts in different positions.
Figure 3:
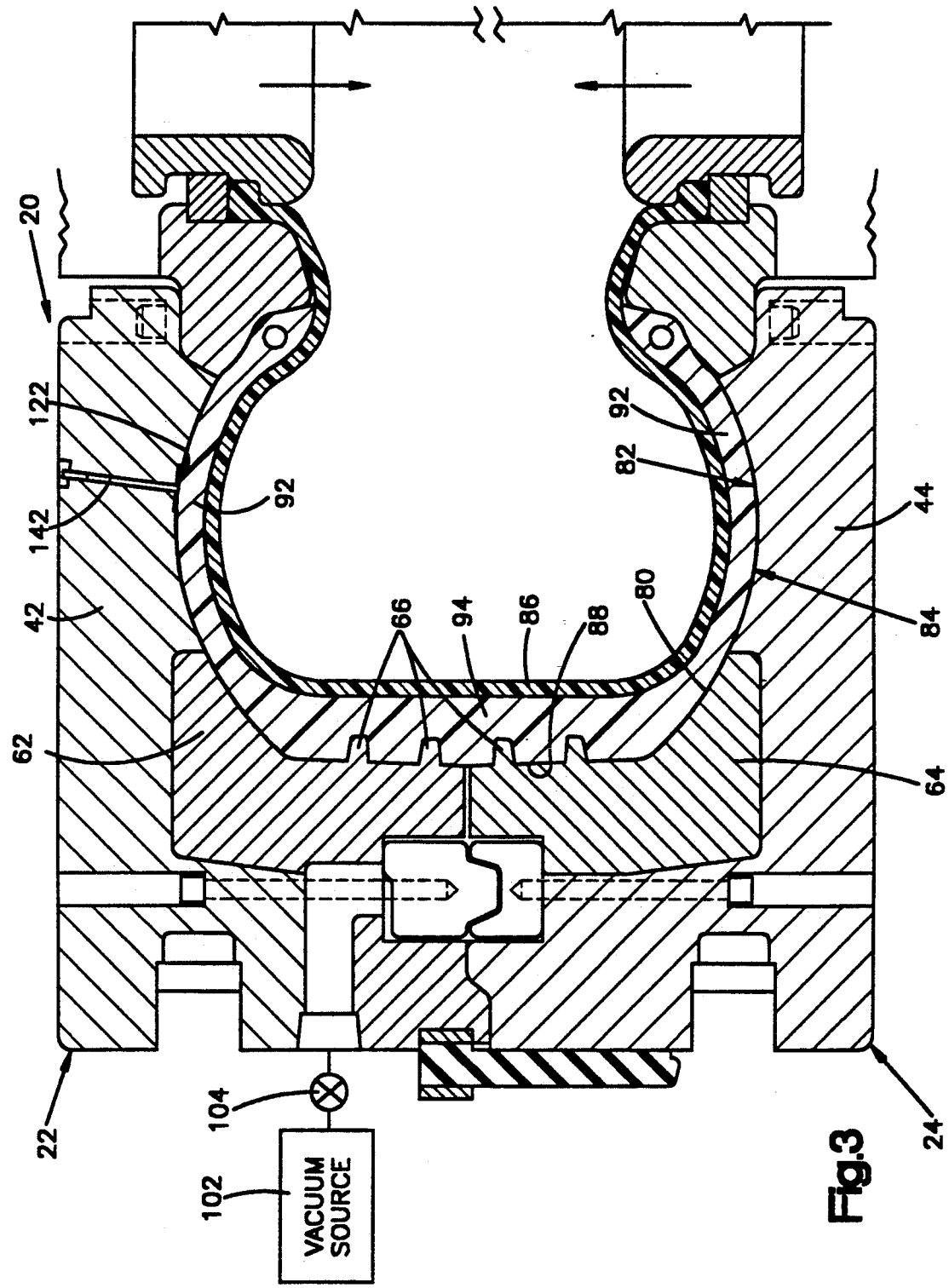

When the mold halves 22,24 are in an unclosed position but in relatively close proximity, as illustrated in FIG. 1, the valve 104 is actuated to open and permit the vacuum source 102 to start to remove air from the cavity 82. The vacuum source 102 continues to evacuate air when the mold halves 22,24 are moved to the closed position, as illustrated in FIG. 2. The sidewalls 92 of the uncured tire 84 are the most flexible portion of the tire and are more easily deflected than the tread portion 94. Thus, upon inflation of the bladder 86, the sidewalls 92 engage the sidewall portions 42,44 before the tread portion 94 engages the tread rings 62,64. The tread rings 62,64 have ribs 66 projecting into the cavity 82 for forming grooves in the tire 84. The ribs 66 space the tread portion 94 from the tread rings 62,64 until the pressure within bladder 86 is increased sufficiently to force the tread portion against the tread rings, as illustrated in FIG. 3.

The sidewall portion 42 includes a blind pocket or recess 122 (best seen in FIG. 4) extending from the cavity 82. The recess 122 is for forming a marking on the sidewall of the tire, such as a raised white letter or a white sidewall. The recess 122 generally has a depth, taken in a direction away from the cavity 82, in the range of 0.100 inch to 0.150 inch. During pressurization of the bladder 86, the sidewalls 92 deform first as described above. The upper sidewall 92 of the uncured tire 84, as viewed in FIG. 2, is forced against the sidewall portion 42 and closes off the recess 122 before the tread portion 94 is pressed against the tread rings 62,64. Air is still being evacuated from between the tread portion 94 and the tread rings 62,64 but the flow of air from the recess 122 is blocked off from the vacuum source 102 by the uncured tire 84.

The recess 122 is vented to atmosphere through a passage 142. The passage 142 allows fluid communication between the recess 122 and the exterior of the mold half 42. The passage 142 is preferably formed by drilling through the sidewall portion 42 to form an opening with a diameter of approximately 0.062 inch. Fluid is forced into the passage 142 from between the surface defining the recess 122 and the sidewall 92 of the uncured tire 84 by the bladder 86 pressing the sidewall of the tire outwardly. It will be apparent that more than one passage 142 can be utilized and can be located in any appropriate position along the recess 122.

The passage 142 is divided into a pair of end portions 162,164 (FIG. 4). The first end portion 162 of the passage 142 is located adjacent the recess 122. The second end portion 164 of the passage 142 is located adjacent the exterior of the sidewall portion 42 of the mold half 22. The length L1 of the second end portion 164 of the passage 142 is less than one half of the entire length L2 of the passage 142. The lengths L1,L2 are taken in a direction parallel to the direction of fluid flow through the passage 142. In the preferred embodiment, the passage 142 is illustrated as straight with the overall length L2 being at least two inches. However, it will be apparent that a curved or other shaped passage could be used.

Located completely within the second end portion 164 of the passage 142 is a restrictor 182. The restrictor 182 is located in the passage 142 a distance far enough away from the recess 122 that it is unlikely to plug with cured rubber from the tire 84. During experimentation, it has been observed that the elastomeric material comprising the uncured tire 84 does not flow beyond the first end portion 162 of the passage 142. Any elastomeric material flowing into the passage 142 is cured and then removed from the tire during a grinding operation performed on the sidewall marking that exposes white rubber of the marking.

The restrictor 182 (FIG. 5) comprises a metal cylindrical member 200 having a plurality of grooves 184

(FIG. 6) located in the exterior surface of the cylindrical member. Each of the grooves 184 is formed by an upset operation. The upset operation involves mechanically deforming a portion of the cylindrical member 200 which results in projections 186 (FIG. 6) being raised approximately 0.0005 inch to 0.007 inch adjacent both edges of each groove 184. When the cylindrical member 200 is inserted into the second end portion 164 of the passage 142, the projections 186 engage the surface defining the passage at circumferentially spaced locations as illustrated in FIG. 7 and conform to the size of the passage by deforming if necessary. The diameter D of the cylindrical member 200 is slightly smaller, by approximately 0.001 inch, than the finished diameter of the passage 142 which results a gap G (shown exaggerated) substantially along the entire length of the cylindrical member.

The grooves 184 extend axially in a direction substantially parallel to the longitudinal central axis A of the cylindrical member 200 from a first axial end 202 to adjacent, but not through, a second axial end 204. The second axial end 204 (FIG. 4) of the cylindrical member 200 is located in the second end portion 164 of the passage 142. The first axial end 202 of the cylindrical member 200 is located closer to the exterior of the sidewall portion 42 of the mold half 22 than the second axial end 204 when the cylindrical member is inserted into the second end portion 164 of the passage 142.

The gap G is approximately 0.0005 inch and permits fluid to escape from the passage 142 when the recess 122 is sealed off from the cavity 82 by the sidewall of the tire 84. Allowing fluid to escape from the recess 122 and passage 142 prevents blemishes in the marking due to fluid buildup in the recess 122. When the cylindrical member 200 is located in the second end portion 164, the effective cross-sectional area of the second end portion 164 of the passage 142 through which fluid may flow is effectively reduced to an area substantially less than the cross-sectional area of the first end portion 162 of the passage. The cross-sectional areas are taken in a direction substantially perpendicular to the direction of fluid flow through the passage 142.

The reduced effective cross-section of the second end portion 162 of the passage 142 severely restricts the flow of fluid into the passage, the recess 122 and the cavity 82 when the vacuum source 102 communicates with the cavity before the tire 84 blocks off the recess 122. The area through which fluid may flow is sufficiently restricted so the vacuum source 102 can maintain a relatively large negative pressure within the cavity 82 before the recess 122 is sealed off. The area through which fluid may flow is also sufficiently large so fluid may escape from the recess 122 and passage 142 when the recess is sealed from the vacuum source 102 by the uncured tire 84. Thus, an effective vacuum molding system is provided with a vented recess 122 to enable a blemish free marking to be formed on a cured tire.

The depth (FIG. 6) of each groove 184 taken in a direction radially of the longitudinal central axis A of the cylindrical member 200 gradually decreases as the groove extends from the first axial end 202 of the cylindrical member 200 to the second axial end 204. Preferably, the depth F1, taken adjacent the first axial end 202, is approximately 0.008 inch or less. Preferably, the depth F1, taken at approximately the longitudinal midpoint of the cylindrical member 200, is approximately 0.002 or less. Preferably, the cylindrical member 200 is inserted into the second end portion 164 of the passage 142 so more than half of the length L3 of the cylindrical member is in contact with the surface defining the second end portion of the passage. The flow of fluid through the passage 142 can be varied by varying the depth of insertion of the cylindrical member 200 in the second end portion 164 of the passage. The flow of fluid through the gap G is restricted not only by the effective cross-sectional area of the gap but by friction between the fluid moving over the surfaces of the second end portion 164 of the passage 142 and the cylindrical member 200. Thus, it will be apparent that the cylindrical member 200 may be inserted further into the second end portion 164 of the passage 142 from the position illustrated in FIG. 4 to further restrict the flow of fluid through the second end portion 164 of the passage 142.

The effective cross-sectional area through which fluid may flow through the gap G between the cylindrical member 200 is no greater than approximately 0.00010 square inch. Preferably, the effective cross-sectional area of the second end portion 164 of the passage 142 through which fluid may flow when the cylindrical member 200 is located in the second end portion is substantially less than cross-sectional area of the smallest opening of a known effective vent plug. For example, a known vent plug having a 0.015 inch diameter opening and is insertable into a 0.125 inch passage has a flow area of 0.00018 square inch. Thus, the cylindrical member 200 better restricts fluid flow than the known vent plug with the smallest effective opening and is not prone to clogging.

An enlarged portion 222 (FIG. 4) of the second end portion 164 of the passage 142 allows access to the restrictor 182 located adjacent the exterior of the sidewall portion 62. The enlarged portion 222 allows a suitable tool, such as pliers, to grip the restrictor 182 to remove the restrictor by pulling the restrictor from second end portion 162 of the passage 142. Preferably, the enlarged portion 222 has a circular cross-section with a diameter at least three times the diameter of the second end portion 164 of the passage 142. The restrictor 182 may also be inserted further into the second end portion 164 of the passage 142 by a suitable tool.

The enlarged portion 222 also permits a new restrictor 182 to be inserted into the second end portion 164 of the passage 142 by the suitable tool and to allow the tool to release its grip on the restrictor so it can be withdrawn from the opening. It will be apparent that the mold half 22 will have to be separated from the curing press in order to accomplish the removal of the restrictor 182. However, it will also be apparent the second end portion 162 of the passage 142 may be routed radially in the mold half 22 so that removal of the restrictor 182 may be made easier.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, what is claimed is:

1. An apparatus for molding a tire, said apparatus comprising:

a pair of mold halves, each of said mold halves including surface means cooperable to define a cavity for receiving and shaping the tire and a recess extending from the cavity to form an indicia on the sidewall of the tire;

means for pressing the tire against said surface means;

actuatable vacuum means for evacuating fluid from the cavity and the recess and located between the tire and said surface means defining the cavity as said pressing means presses the tire against said surface means defining the cavity;

passage means for fluidly communicating the cavity and the recess with the atmosphere, said passage means including a first end portion adjacent the cavity and a second end portion adjacent the exterior of said pair of mold halves, said second end portion having a length less than half the length of said passage means in which the lengths are taken in a direction substantially parallel to the direction of fluid flow through said passage means; and means located entirely within said second end portion of said passage means for restricting fluid at atmospheric pressure from flowing into the cavity and the recess during actuation of said vacuum means.

2. The apparatus set forth in claim 1 wherein said restricting means comprises a cylindrical member for reducing the effective cross-sectional area of said second end portion of said passage means through which the fluid at atmospheric pressure may flow to an area substantially less than the cross-sectional area of said first end portion of said passage means, the cross-sectional areas being taken in a direction substantially perpendicular to the direction of fluid flow through said passage means.

3. The apparatus set forth in claim 2 wherein said cylindrical member includes at least one groove located in the exterior surface of said cylindrical member and extending from a first axial end of said cylindrical member to adjacent a second axially opposite end of said cylindrical member.

4. The apparatus set forth in claim 3 wherein the groove has a depth taken in a direction substantially radially of the longitudinal central axis of said cylindrical member and which depth decreases as the groove extends from the first axial end toward the second axial end.

5. The apparatus set forth in claim 4 wherein said cylindrical member is positioned in said second end portion of said passage means so said first axial end of said cylindrical member is located closer to the exterior of said pair of mold halves than said second axial end of said cylindrical member.

6. The apparatus set forth in claim 5 wherein said cylindrical member is inserted in said second end portion of said passage means to a predetermined depth of contact with a portion of a surface defining said passage means, said predetermined depth of contact is at least equal to one half the length of said cylindrical member.

7. The apparatus set forth in claim 6 wherein said predetermined depth is variable to vary the resistance to flow through said second end portion of said passage means.

8. The apparatus set forth in claim 3 further including a portion of said second end portion of said passage means located adjacent the exterior of said pair of mold halves having a greater cross-sectional area than the remainder of said second end portion of said passage means to enable a suitable tool to grip said cylindrical member and remove said cylindrical member from the remainder of said second end portion of said passage means.

9. The apparatus set forth in claim 2 wherein the effective cross-sectional area of said second end portion of said passage means is less than 0.00018 square inch.

10. An apparatus for molding a tire, said apparatus comprising:

a mold having surface means defining a cavity for receiving and shaping an uncured tire;

means for pressing the uncured tire against said surface means defining the cavity;

actuatable means for evacuating fluid from the cavity and located between the uncured tire and said surface means defining the cavity;

a recess extending from the cavity for forming a marking on a sidewall of the tire;

passage means for fluidly communicating the recess with the atmosphere, said passage means including a first end portion adjacent the recess and a second end portion adjacent the exterior of said mold and extending for a distance less than one-half of the total length of said passage means taken in a direction parallel to the direction of fluid flow through said passage means; and restrictor means located entirely within said second end portion of said passage means for restricting fluid flow at atmospheric pressure through said passage means during actuation of said evacuating means and before the recess is sealed off from the cavity by said pressing means pressing the uncured tire against said surface means defining the cavity.

11. The apparatus set forth in claim 10 wherein said restrictor means comprises a cylindrical member having at least one groove located in the exterior surface of said cylindrical member and extending from a first axial end of said cylindrical member to adjacent a second axially opposite end of said cylindrical member.

12. The apparatus set forth in claim 10 wherein the groove has a depth taken in a direction radially of the longitudinal central axis of said cylindrical member and which depth decreases as the groove extends from the first axial end toward the second axial end.

13. The apparatus set forth in claim 12 wherein said cylindrical member is positioned in said second end portion of said passage means so said first axial end of said cylindrical member is located closer to the exterior of said mold than said second axial end of said cylindrical member.

14. The apparatus set forth in claim 13 wherein said cylindrical member is inserted in said second end portion of said passage means to a predetermined depth of contact with a portion of a surface defining said passage means, said predetermined depth of contact is at least equal to one half the length of said cylindrical member.

15. The apparatus set forth in claim 14 wherein said predetermined depth is variable to vary the resistance to flow through said second end portion of said passage.

16. The apparatus set forth in claim 11 further including a portion of said second end portion of said passage means located adjacent the exterior of said mold having a greater cross-sectional area than the remainder of said second end portion of said passage means to enable a suitable tool to grip said cylindrical member and remove said cylindrical member from said second end portion of said passage means.

17. The apparatus set forth in claim 10 wherein the effective cross-sectional area of said second end portion of said passage means through which fluid may flow is less than 0.00018 square inch.

18. A method for molding a tire, said method comprising the steps of:
- placing an uncured tire in a cavity of a mold having a recess extending from the cavity to form an indicia on the sidewall of the tire;
- pressing the uncured tire against surfaces defining the cavity and the recess;
- evacuating fluid in the cavity and recess from between the uncured tire and the surfaces defining the cavity and the recess during said pressing step;
- venting the recess to the atmosphere through a passage having a first end portion adjacent the recess and a second end portion adjacent the exterior of the mold and which second end portion has a length less than half of the total length of the passage;
- restricting the flow of fluid at atmospheric pressure through the second end portion of the passage during evacuation of fluid from the cavity and the recess before the recess is sealed off from the cavity by the tire being pressed against surfaces defining the cavity; and
- curing the tire.

19. The method set forth in claim 18 wherein said restricting step is performed by a cylindrical member having an axially extending groove, the cylindrical member being located entirely within the second end portion of the passage.

20. An apparatus for molding a tire in which the apparatus includes a mold having a surface defining a cavity for receiving and shaping an uncured tire, a bladder for pressing the uncured tire against the surface defining the cavity, an actuatable vacuum source for evacuating fluid in the cavity from between the uncured tire and the surface defining the cavity, and a recess extending from the cavity for forming a marking on a sidewall of the tire; wherein the improvement comprises:
- passage means for fluidly communicating the recess with the atmosphere, said passage means including a first end portion adjacent the recess and a second end portion adjacent the exterior of the mold and extending for a distance less than one-half of the total length of said passage means taken in a direction substantially parallel to the direction of fluid flow through said passage means; and
- means located entirely within said second end portion of said passage means for restricting fluid flow at atmospheric pressure into the recess and cavity during actuation of the vacuum source.

21. The apparatus set forth in claim 20 wherein said restricting means comprises a cylindrical member having at least one groove located in the exterior surface of said cylindrical member and extending from a first axial end of said cylindrical member to adjacent a second axially opposite end of said cylindrical member.

22. The apparatus set forth in claim 21 wherein the groove has a depth taken in a direction radially of the longitudinal central axis of said cylindrical member and which depth decreases as the groove extends from the first axial end toward the second axial end.

23. The apparatus set forth in claim 22 wherein said cylindrical member is positioned in said second end portion of said passage means so said first axial end of said cylindrical member is located closer to the exterior of said mold than said second axial end of said cylindrical member.

24. The apparatus set forth in claim 23 wherein said cylindrical member is inserted in said second end portion of said passage means to a predetermined depth of contact with a portion of a surface defining said passage means, said predetermined depth of contact is at least equal to one half the length of said cylindrical member.

25. The apparatus set forth in claim 24 wherein said predetermined depth is variable to vary the resistance to fluid flow through said second end portion of said passage means.

26. The apparatus set forth in claim 21 further including a portion of said second end portion of said passage means located adjacent the exterior of said mold having a greater cross-sectional area than the remainder of said second end portion of said passage means to enable a suitable tool to grip said cylindrical member and remove said cylindrical member from said second end portion of said passage means.

27. The apparatus set forth in claim 21 wherein the effective cross-sectional area of said second end portion of said passage means through which fluid may flow is less than 0.00018 square inch.

28. The apparatus set forth in claim 21 further including a plurality of projections extending from said cylindrical member for spacing said cylindrical member a predetermined distance away from a surface defining the second end portion of said passage means.

* * * * *